(No Model.)
E. H. SUBLETT.
COMBINED BRUSH HOOK AND AX.
No. 299,876. Patented June 3, 1884.
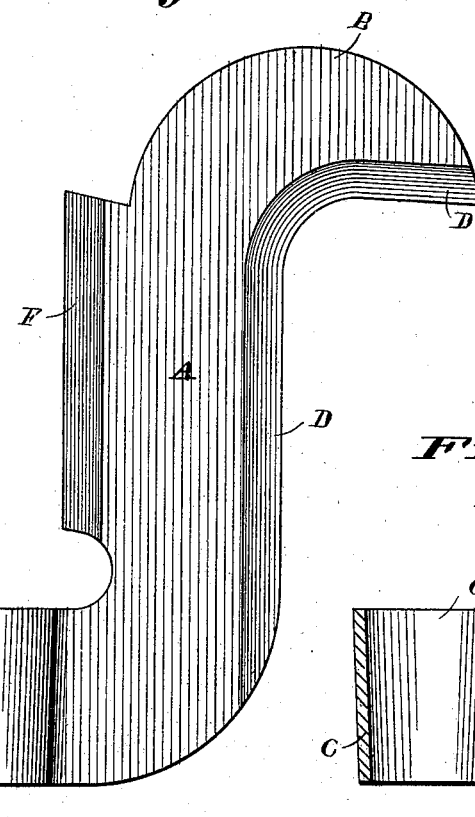
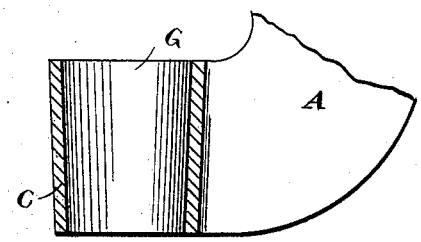
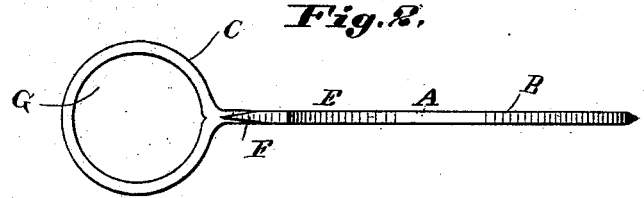
Attest:
Charles Pickles
Geo. L. Wheelock
Inventor:
E. H. Sublett
By Knight Bros
Attys

UNITED STATES PATENT OFFICE.

EDWIN H. SUBLETT, OF ST. LOUIS, MISSOURI, ASSIGNOR TO SIMMONS HARDWARE COMPANY, OF SAME PLACE.

COMBINED BRUSH-HOOK AND AX.

SPECIFICATION forming part of Letters Patent No. 299,876, dated June 3, 1884.

Application filed February 27, 1884. (No model.)

*To all whom it may concern:*

Be it known that I, EDWIN H. SUBLETT, of the city of St. Louis, in the State of Missouri, have invented a certain new and useful Improvement in Combined Brush-Hook and Ax, of which the following is a full, clear, and exact description, reference being had to the accompanying drawings, forming part of this specification, and in which—

Figure 1 is a side view. Fig. 2 is a front end view; and Fig. 3 is a section of the eye of the tool, showing part of the blade.

A is the body, B a hook formed on one end, and C a projection formed on the other end. D is a cutting-blade on one edge of the body and hook, and E a projection on the other edge of the body, having a long cutting-blade, F, in rear of the socket or eye G in the projection C. The socket or eye is tapering, as shown in Fig. 3, being of the smallest diameter at the handle end. Thus, when a handle is put into the socket or eye in advance of the cutting-blade F and made fast by a wedge, it will be impossible for it to be pulled out, and any force brought upon the handle in the use of the tool will tend to tighten it in the socket.

I claim as my invention—

A combined brush-hook and ax formed in one piece, having body A, hook B, cutting-blade D on one edge of the body, long cutting-blade F on the other edge of the body, and a projection, C, having a tapering socket or eye in advance of the long cutting-blade, as set forth.

EDWIN H. SUBLETT.

In presence of—
   GEO. H. KNIGHT,
   SAML. KNIGHT.